Patented Oct. 24, 1950

2,527,266

UNITED STATES PATENT OFFICE 2,527,266

METHINE DYESTUFFS

John David Kendall and George Frank Duffin, Ilford, England, assignors to Ilford Limited, Ilford, England, a British company No Drawing. Application November 9, 1948, Serial No. 59,181. In Great Britain Nov. 10, 1947

18 Claims. (Cl. 260—240.4)

This invention relates to the manufacture of dyestuffs and particularly to the manufacture of methine dyestuffs containing a thiazolidone ring.

In our co-pending application Serial No. 59,180, filed on even date herewith and corresponding to British application No. 29,921/47, we have described the production of compounds of the general formula I:

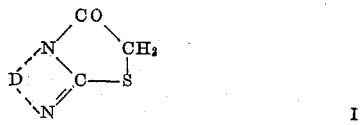

where D is the residue of a five-membered or six-membered heterocyclic nitrogen nucleus. Thus D may be a chain of 2 or 3 atoms selected from carbon and nitrogen, at least one of these atoms being carbon. These compounds are prepared by heating a compound of the general formula II:

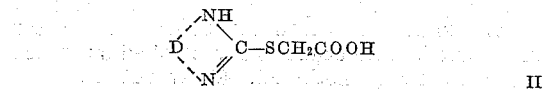

where D is the residue of a heterocyclic nitrogen nucleus, preferably in the presence of a dehydrating solvent, or by heating the corresponding ester to a temperature at or above the fusion temperature of the ester.

According to the present invention valuable methine dyestuffs are obtained by reacting a compound of the general formula I with (as second reactant) an alkyl or aralkyl quaternary salt of a heterocyclic nitrogen compound of any of the types well known and described for use in the production of cyanine dyes, which contains a reactive thioether or selenoether group (which expression includes an aryl-, alkyl- or aralkyl-thioether or -selenoether group and groups of any of these types which are separated from the heterocyclic nitrogen nucleus by two or more methine or substituted methine groups), or an aminovinyl type of group, i. e. a $$-(CH=CH)_n-NH_2$$

group where $n$ is a positive integer or an N-substituted group of this type (including N-aryl, N-acyl and N-acyl-aryl groups of this type).

The various reactions are based on the reactivity of the methylene group of the thiazolidone ring of the compound of general formula I and depend on the removal of the two hydrogen atoms of that group with the resulting formation of a double bond linking the carbon atom of the methylene group to the residue of the other reactant.

Thus dyestuffs of particular value which may be produced by the process of the present invention conform to the general formula:

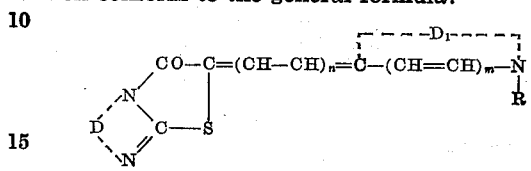

where D has the significance given above, $D_1$ is the residue of a heterocyclic nitrogen compound of the type commonly used in cyanine dyes, $n$ is selected from the class consisting of nought, 1, 2 and 3, and $m$ is selected from the class consisting of nought and one.

The residue D may be, for example, the residue of an iminazole, dihydroiminazole, benziminazole, pyrimidine, quinazoline, triazole and their keto derivatives, e. g. pyrimidone, iminazolone or triazolone.

Heterocyclic nitrogen compounds with which the compounds of general formula I may be reacted are, for example, the alkyl or aralkyl quaternary salts of thiazoles, thiazolines, oxazoles, oxazolines, selenazoles, selenazolines, pyridines, quinolines, lepidines, indolenines, diazines (for example pyrimidines), thiodiazoles and quinazolines, and the corresponding substituted and unsubstituted polycyclic compounds of these series such as benzthiazoles, naphthathiazoles and anthrathiazoles, and also the diazoles described in British Patent No. 425,609.

These compounds may contain in $\alpha$ or $\gamma$ position to the heterocyclic quaternary nitrogen atom any of the following groupings:

$$-SR_1 \qquad -SeR_1$$
$$-(CR_2=CR_3)_n-SR_1 \qquad -(CR_2=CR_3)_n-SeR_1$$

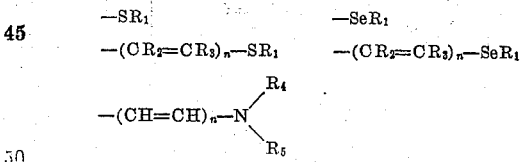

where $n$ is a small integer, e. g. 1, 2 or 3, $R_1$ is an alkyl, aryl, or aralkyl group, $R_2$ and $R_3$ are each a hydrogen atom or a hydrocarbon group, and $R_4$ and $R_5$ are aryl or acyl groups.

The quaternary salt may be, for example, an alkyl or aralkyl sulphate, halide (e. g. chloride, bromide or iodide), p-toluene sulphonate or perchlorate.

Where in this specification alkyl groups are referred to they may be, for example, methyl, ethyl, propyl, butyl or higher alkyl groups; aryl groups may be, for example, phenyl or naphthyl, and aralkyl groups may be, for example, benzyl and naphthylmethyl. The term "acyl" group is intended to mean a group of the structure R.CO— where R is a hydrocarbon group.

It is not essential according to this invention to isolate the compound of general formula I from the reaction mixture in which it is formed, and indeed it is a very convenient process according to this invention to form the compound of general formula I and the methine dyestuff from it as a single operation. This is effected by reacting together a compound of general formula II, a dehydrating solvent such as acetic anhydride or propionic anhydride, and the heterocyclic nitrogen compound referred to as the second reactant.

Preferably, in cases where the second reactant is a heterocyclic nitrogen compound containing a reactive group as specified above, the reaction is effected in the presence of an acid binding agent, e. g. sodium acetate or an organic base such as pyridine or triethylamine. Where the reaction mixture also contains an acid anhydride it is preferred to use a tertiary organic base.

The dyestuffs obtained according to this invention are in general valuable sensitisers for silver halide photographic emulsions.

The following examples, in which all the parts are by weight, serve to illustrate the invention.

Example 1

Preparation of the dyestuff of the formula:

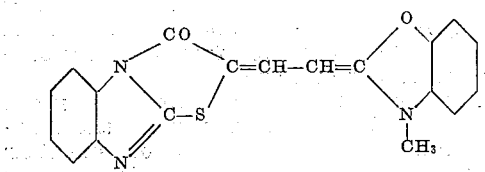

0.475 part of 2:3-(benziminazo-1':2')-thiazolidone-4 and 0.98 part of 2-ω-ethylthio vinyl benzoxazole methyl p-toluene sulphonate were dissolved in 20 parts of alcohol and 0.4 part of triethylamine added. The solution was boiled for 20 minutes on the water-bath, cooled and filtered. The crude dye was boiled out twice with 150 parts of methanol. M. Pt. 302° C.

This dye, when incorporated in a gelatino silver iodobromide emulsion, imparted a band of sensitivity extending to 5700 Å. with an indeterminate maximum at about 4950 Å.

Example 2

Preparation of the dyestuff of the formula:

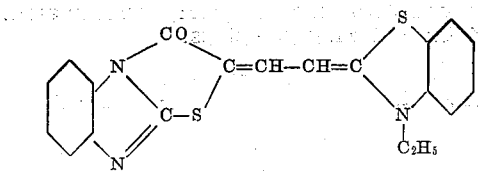

0.475 part of 2:3-(benziminazo-1':2'-)thiazolidone-4 and 1.125 parts of 2-ω-acetanilido vinyl benzthiazole ethiodide were dissolved in 20 parts of alcohol. 0.4 part of triethylamine was added and the solution boiled for 20 minutes on the water-bath. It was cooled, filtered and the crude dye boiled out twice with 200 parts of methanol. M. Pt. 284° C.

This dye, when incorporated in a gelatino silver iodobromide emulsion, imparted a band of sensitivity extending to 5900 Å. with a shallow maximum at about 5200 Å.

Example 3

Preparation of the dyestuff of the formula:

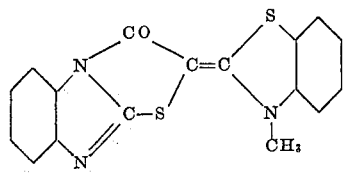

0.475 part of 2:3-(benziminazo-1':2')-thiazolidone-4 and 0.81 part of 2-methylthio benzthiazole methiodide were dissolved in 25 parts of ethyl alcohol and 0.5 part of triethylamine added. The solution was boiled on the water-bath for half an hour, poured into water, filtered and dried. The crude dye was boiled out twice with 200 parts of methanol. M. Pt.>300° C.

Example 4

Preparation of the dyestuff of the formula:

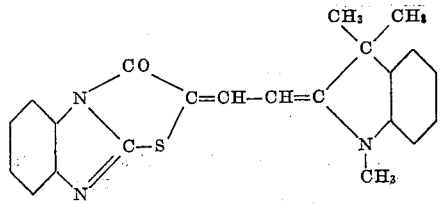

0.475 part of 2:3-(benziminazo 1':2')-thiazolidone-4 and 1.12 parts of 2-ω-acetanilido vinyl 3:3 dimethyl indolenine methiodide were dissolved in 25 parts of ethyl alcohol and 0.5 part of triethylamine added. The solution was boiled on a water-bath for 20 minutes, poured into water and filtered. The crude dye was boiled out twice with 100 parts of methanol. M. Pt. 246° C.

Example 5

Preparation of the dyestuff of the formulae:

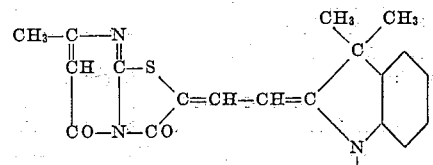

or

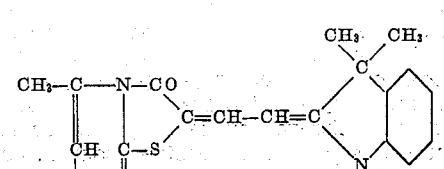

1.00 part of S[6-keto 4-methyl dihydropyrimidyl-(2)] thioglycollic acid and 2.24 parts of 2-ω-acetanilido-vinyl 3:3-dimethylindolenine methiodide were dissolved in 20 parts of pyridine, 1.0 part of acetic anhydric was added and the mixture heated on the water-bath for one hour. It was poured into water, cooled and allowed to crystallise and filtered. The crude dye was boiled out with 200 parts of methanol. M. Pt. 236° C.

*Example 6*

Preparation of the dyestuff of the formulae:

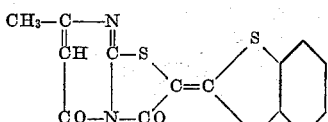

or

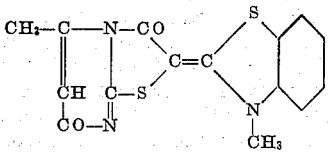

1.00 part of S-[6-keto 4-methyl dihydropyrimidyl-(2)] thiogylcollic acid and 1.62 parts of 2-methylthio benzthiazole methiodide were dissolved in 20 parts of pyridine and 1 part of acetic anhydride added. The mixture was heated on the water-bath for 30 minutes, cooled, diluted with an equal volume of alcohol and filtered. The crude dye was boiled out with 200 parts of methanol. M. Pt. >300° C.

*Example 7*

Preparation of the dyestuff of the formulae:

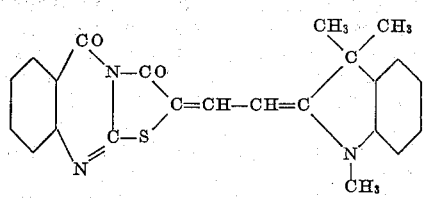

or

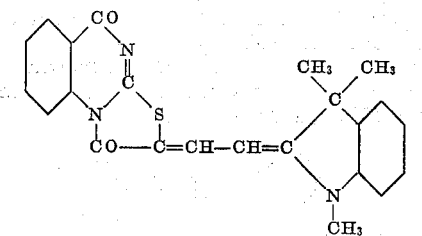

1.18 parts of S[4-keto dihydroquinazolyl-(2)]-thioglycollic acid and 2.24 parts of 2-ω-acetanilido vinyl 3:3-dimethylindolenine methiodide were dissolved in 20 parts of pyridine, 1.0 part of acetic anhydride was added and the mixture heated on the water-bath for one hour. It was poured into water, cooled, and crystallised and filtered. The crude dye was boiled out twice with 100 parts of methanol. M. Pt. 281° C.

*Example 8*

Preparation of the dyestuff of the formulae:

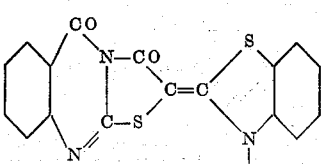

or

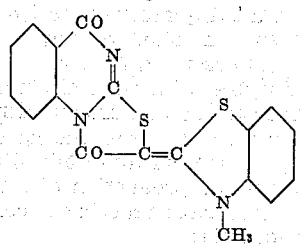

1.18 parts of S[4-keto dihydroquinazolyl-(2)] thioglycollic acid and 1.62 parts of 2-methylthio benzthiazole methiodide were dissolved in 20 parts of pyridine and 1 part of acetic anhydride added. The mixture was heated on the water-bath for 30 minutes, cooled, diluted with an equal volume of ethyl alcohol and filtered. The crude dye was boiled out twice with 200 parts of methanol. M. Pt. >300° C.

*Example 9*

Preparation of the dyestuff of the formula:

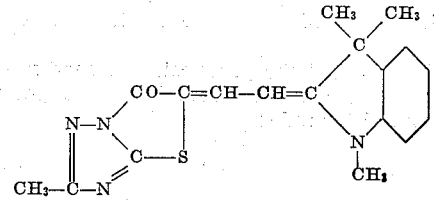

5-methyl 1:3:4-triazole 2-thioglycollic acid (0.5 part by weight) and 2-ω-acetanilidovinyl 3:3-dimethyl indolenine methiodide (1.29 parts by weight) were dissolved in pyridine (10 parts by volume) and acetic anhydride (1 part by volume) was added. The mixture was boiled for one hour, poured into water and the precipitated dye filtered off. It was boiled out with methyl alcohol (50 parts by volume) yielding the product as an orange powder, M. Pt. above 300°.

What we claim is:

1. Process for the production of methine dyestuffs which comprises reacting a compound of the general formula:

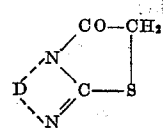

where D is the residue of a ring system selected from five-membered and six-membered systems, with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups.

2. Process for the production of methine dyestuffs which comprises reacting a compound of the general formula:

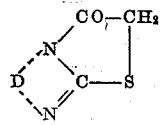

where D is a chain of more than one and less than 4 atoms selected from carbon and nitrogen, at least one of these atoms being carbon, with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups.

3. Process for the production of methine dyestuffs which comprises reacting a compound of the general formula:

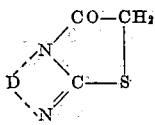

where D is the residue of a benziminazole nucleus with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups.

4. Process for the production of methine dyestuffs which comprises reacting a compound of the general formula:

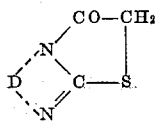

where D is the residue of a pyrimidyl nucleus with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups.

5. Process for the production of methine dyestuffs which comprises reacting a compound of the general formula:

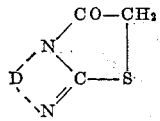

where D is the residue of a ring system selected from five-membered and six-membered systems, with an alkyl quaternary salt of a heterocyclic compound of any of the types known and described for use in the production of cyanine dyes which contain in one of the α and γ positions to the quaternary nitrogen atom an ω-alkylthio group.

6. Process for the production of methine dyestuffs which comprises reacting a compound of the general formula:

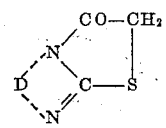

where D is the residue of a ring system selected from five-membered and six-membered systems, with an alkyl quaternary salt of a heterocyclic compound of any of the types known and described for use in the production of cyanine dyes which contain in one of the α and γ positions to the quaternary nitrogen atom an acetanilidovinyl group.

7. Process for the production of methine dyestuffs which comprises reacting a compound of the general formula:

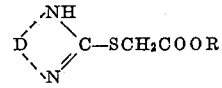

where R is selected from the class consisting of the hydrogen atom and hydrocarbon groups and D is the residue of a ring system selected from five-membered and six-membered systems, with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups, the reaction being effected in the presence of a dehydrating solvent.

8. Process for the production of methine dyestuffs which comprises reacting a compound of the general formula:

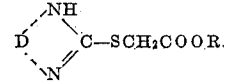

where R is selected from the class consisting of the hydrogen atom and hydrocarbon groups and D is the residue of a ring system selected from five-membered and six-membered systems, with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups, the reaction being effected in the presence of acetic anhydride.

9. Process for the production of methine dyestuffs which comprises reacting a compound of the general formula:

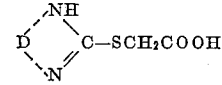

where D is a chain of more than one and less than 4 atoms selected from carbon and nitrogen, at least one of these atoms being carbon, with an alkyl quaternary salt of a heterocyclic compound of any of the types known and described for use in the production of cyanine dyes which contain in one of the α and γ positions to the quaternary nitrogen atom an ω-alkylthio group, the reaction being effected in the presence of a dehydrating solvent.

10. Process for the production of methine dyestuffs which comprises reacting a compound of the general formula:

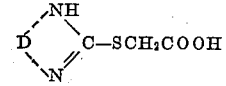

where D is a chain of more than one and less than 4 atoms selected from carbon and nitrogen, at least one of these atoms being carbon, with an alkyl quaternary salt of a heterocyclic compound of any of the types known and described for use in the production of cyanine dyes which contain in one of the α and γ positions to the quaternary nitrogen atom an acetanilidovinyl group, the reaction being effected in the presence of a dehydrating solvent.

11. Process for the production of methine dyestuffs which comprises reacting a compound of the general formula:

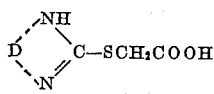

where D is a chain of more than one and less than 4 atoms selected from carbon and nitrogen at least one of these atoms being carbon, with an alkyl quaternary salt of a heterocyclic compound of any of the types known and described for use in the production of cyanine dyes which contain in one of the α and γ positions to the quaternary nitrogen atom an ω-alkylthio group, the reaction being effected in the presence of acetic anhydride.

12. Process for the production of methine dyestuffs which comprises reacting a compound of the general formula:

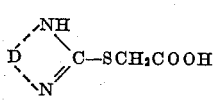

where D is a chain of more than one and less than 4 atoms selected from carbon and nitrogen at least one of these atoms being carbon, with an alkyl quaternary salt of a heterocyclic compound of any of the types known and described for use in the production of cyanine dyes which contain in one of the α and γ positions to the quaternary nitrogen atom an acetanilidovinyl group, the reaction being effected in the presence of acetic anhydride.

13. Process for the production of methine dyestuffs which comprises reacting a compound of the general formula:

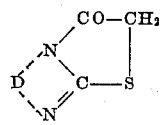

where D is the residue of a benziminazole nucleus with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups, the reacting being carried out in the presence of an acid binding agent.

14. Process for the production of methine dyestuffs which comprises reacting a compound of the general formula:

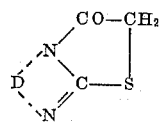

where D is the residue of a pyrimidyl nucleus with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups, the reaction being carried out in the presence of an acid binding agent.

15. Process for the production of methine dyestuffs which comprises reacting a compound of the general formula:

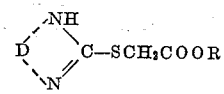

where R is selected from the class consisting of the hydrogen atom and hydrocarbon groups and D is the residue of a ring system selected from five-membered and six-membered systems, with an alkyl or aralkyl quaternary salt of a heterocyclic nitrogen compound of any of the types well known and described for use in the production of cyanine dyes which contain in one of the α and γ positions to the quaternary nitrogen atom a reactive group selected from the class consisting of thioether, selenoether and aminovinyl groups, the reaction being effected in the presence of acetic anhydride and an acid binding agent.

16. A dyestuff of the general formula:

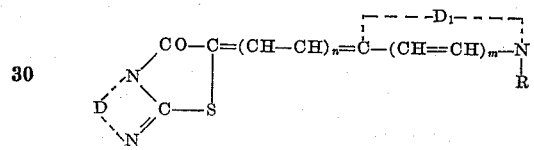

where D is the residue of a ring system selected from five-membered and six-membered systems, R is an alkyl group, D₁ is the residue of a heterocyclic nitrogen compound of the type commonly used in cyanine dyes, n is selected from the class consisting of nought, 1, 2 and 3, and m is selected from the class consisting of nought and one.

17. A dyestuff of the general formula:

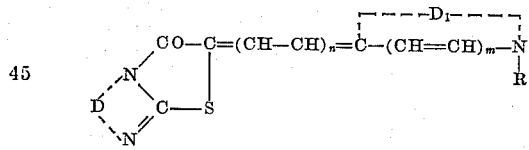

where D is a chain of more than one and less than 4 atoms selected from carbon and nitrogen at least one of these atoms being carbon, R is an alkyl group, D₁ is the residue of a heterocyclic nitrogen compound of the type commonly used in cyanine dyes, n is selected from the class consisting of nought, 1, 2 and 3, and m is selected from the class consisting of nought and one.

18. A dyestuff of the general formula:

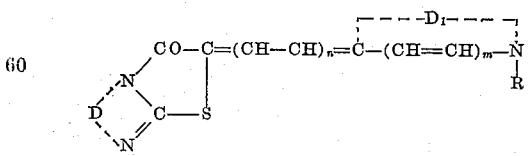

where D is the residue of a ring system selected from five-membered and six-membered systems, R is an alkyl group, D₁ is the residue of a heterocyclic nitrogen nucleus selected from the class consisting of the benzoxazole, benzthiazole and indolenine nuclei, n is selected from the class consisting of nought, 1, 2 and 3, and m is selected from the class consisting of nought and one.

JOHN DAVID KENDALL.
GEORGE FRANK DUFFIN.

(References on following page)

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts 16:3101 (Abstract of Brit. Med. Journal, 1922, I 514–515).

Chemical Abstracts 19:530 (Abstract of Proc. Roy. Soc., London, 96B 317–333, 1924).